(12) United States Patent
Takahashi

(10) Patent No.: US 8,411,551 B2
(45) Date of Patent: Apr. 2, 2013

(54) GUIDE-LAYER SEPARATED OPTICAL RECORDING MEDIUM, OPTICAL RECORDING MEDIUM DRIVE APPARATUS, AND RECORDING LAYER ACCESS METHOD

(75) Inventor: Kazuo Takahashi, Hanno (JP)

(73) Assignee: Pioneer Corporation, Kanagawa (JP)

( * ) Notice: Subject to any disclaimer, the term of this patent is extended or adjusted under 35 U.S.C. 154(b) by 0 days.

(21) Appl. No.: 13/380,729

(22) PCT Filed: Jun. 25, 2009

(86) PCT No.: PCT/JP2009/061608
§ 371 (c)(1),
(2), (4) Date: Mar. 9, 2012

(87) PCT Pub. No.: WO2010/150380
PCT Pub. Date: Dec. 29, 2010

(65) Prior Publication Data
US 2012/0159525 A1    Jun. 21, 2012

(51) Int. Cl.
G11B 7/24    (2006.01)
(52) U.S. Cl. ......................... 369/275.3; 369/279; 369/283
(58) Field of Classification Search ............... 369/275.1, 369/275.2, 275.3, 275.4, 94, 44.11, 100, 369/47.53, 52.1, 272.1, 279, 277, 278, 284, 369/283; 720/718
See application file for complete search history.

(56) References Cited

U.S. PATENT DOCUMENTS

| | | | | |
|---|---|---|---|---|
| 5,764,620 A | * | 6/1998 | Satoh et al. | 369/275.1 |
| 7,304,937 B1 | * | 12/2007 | Xie | 369/272.1 |
| 7,907,502 B2 | * | 3/2011 | Nishikiori et al. | 369/275.4 |
| 8,111,604 B2 | * | 2/2012 | Nakano et al. | 369/275.3 |
| 2008/0239919 A1 | | 10/2008 | Maruyama | |

FOREIGN PATENT DOCUMENTS

| | | |
|---|---|---|
| JP | 04-301226 A | 10/1992 |
| JP | 2008-243299 A | 10/1992 |
| JP | 2002-334448 A | 11/2002 |
| JP | 2004-348963 A | 12/2004 |
| JP | 2005-122862 A | 5/2005 |

* cited by examiner

Primary Examiner — Ali Neyzari
(74) Attorney, Agent, or Firm — Sughrue Mion, PLLC

(57) ABSTRACT

A guide-layer separated optical recording medium includes a guide layer with a guide track formed therein and a plurality of recording layers, these layers being separately deposited from each other. A layer position information region for indicating position information of each of the recording layers, is formed on the guide track within a different range of the guide layer for each of the recording layers. Each of the recording layers includes a preformat region having a predetermined signal written on a record track along the guide track, and the preformat region on each of the recording layers is provided in a region corresponding to the layer position information region. An optical recording medium drive apparatus and a recording layer access method for the guide-layer separated optical recording medium are also provided. The apparatus and method implement: determining whether a reproduced signal has been obtained, based on the detection level of a reflected beam from the preformat region by a read/write optical system; acquiring position information of one of the plurality of recording layers based on the detection level of a reflected beam from a layer position information region by a servo optical system; and causing a second laser beam to access a desired one of the plurality of recording layers in accordance with the determination result of the reproduced signal and the position information.

7 Claims, 11 Drawing Sheets

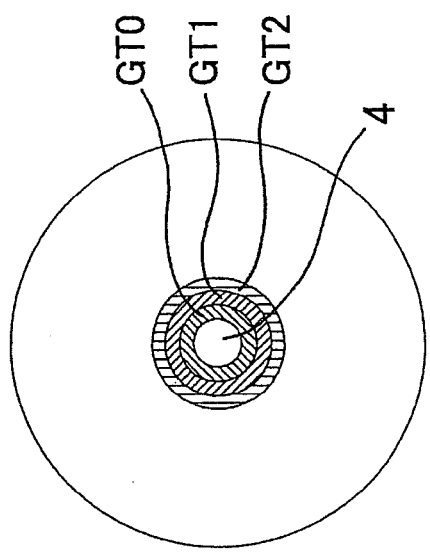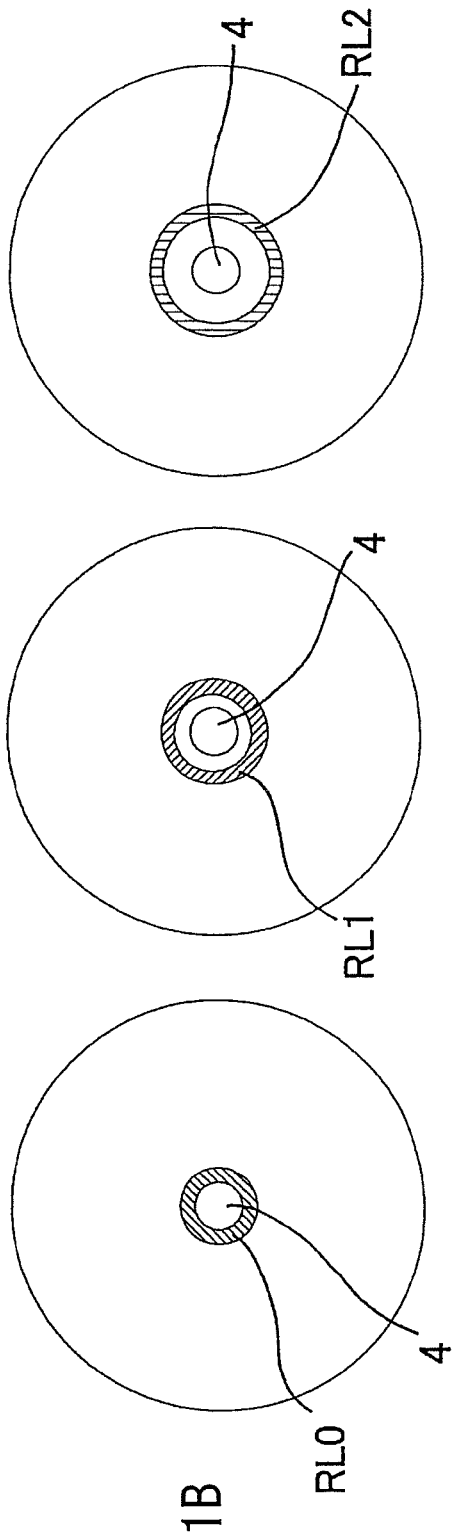

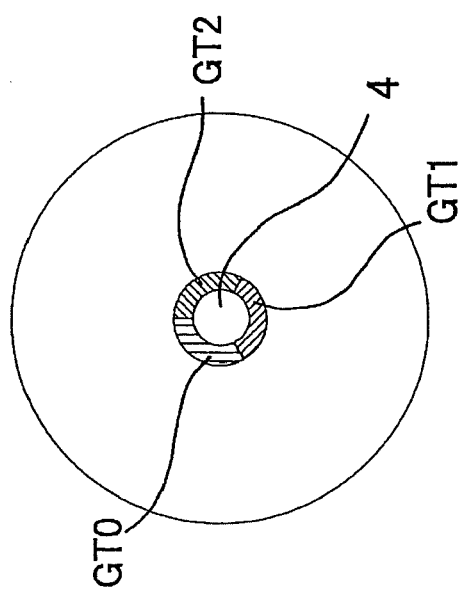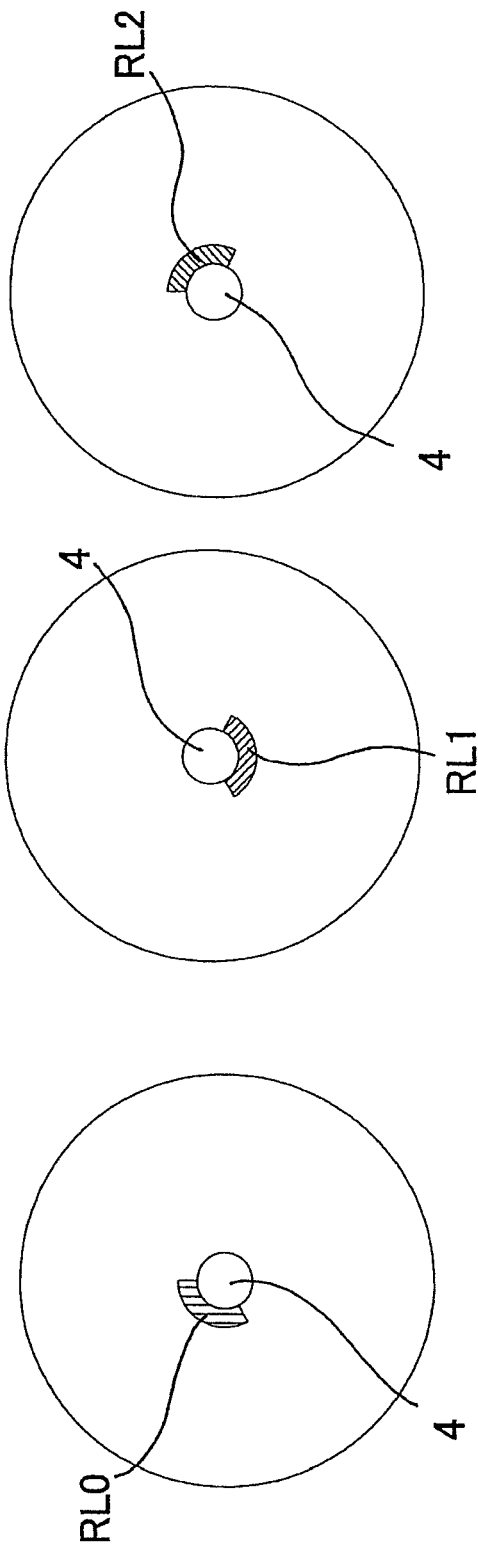

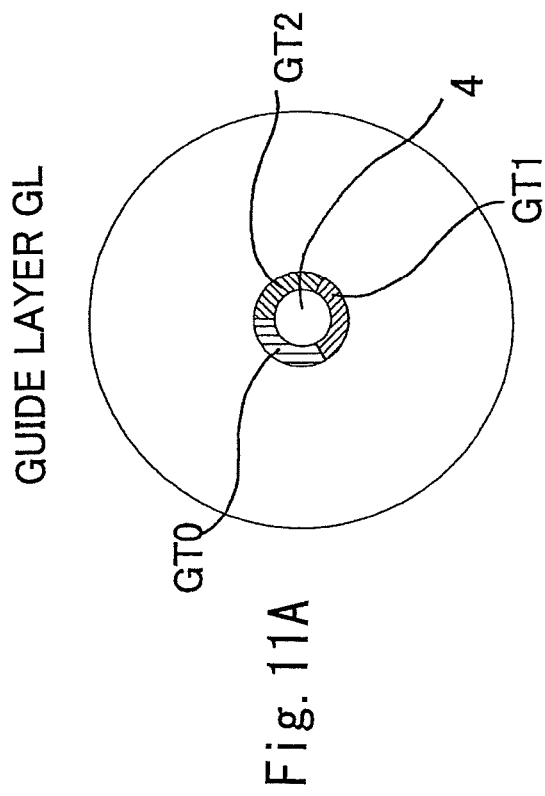
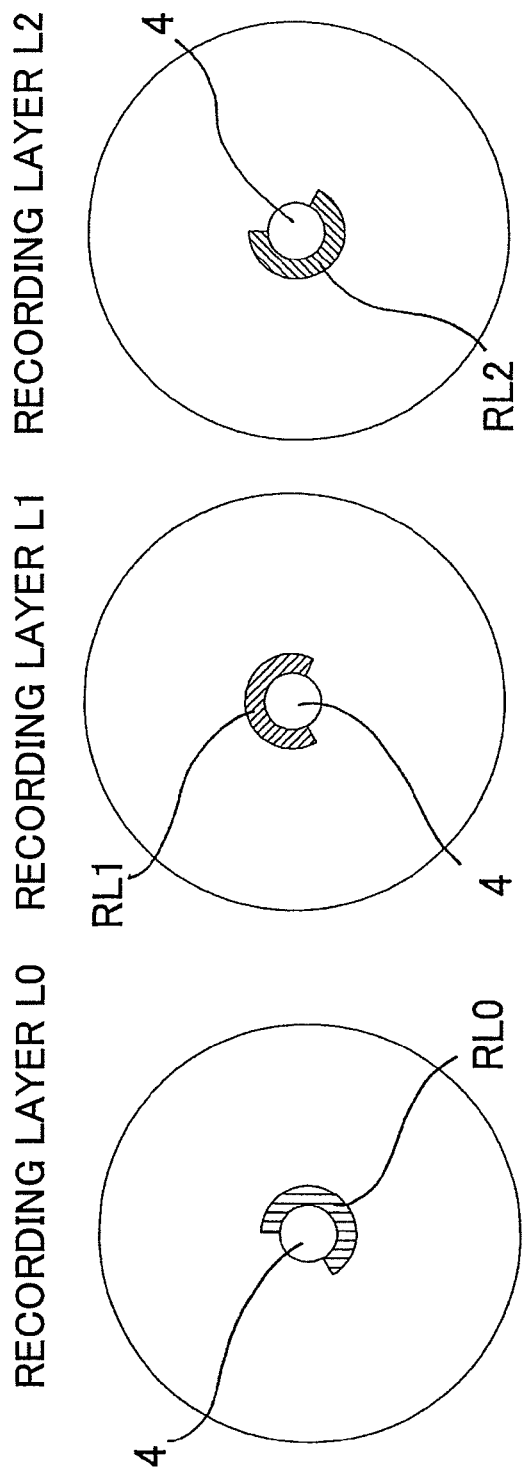

GUIDE-LAYER SEPARATED OPTICAL RECORDING MEDIUM, OPTICAL RECORDING MEDIUM DRIVE APPARATUS, AND RECORDING LAYER ACCESS METHOD

CROSS REFERENCE TO RELATED APPLICATIONS

This application is a National Stage of International Application No. PCT/JP2009/061608 filed Jun. 25, 2009, the contents of all of which are incorporated herein by reference in their entirety.

TECHNICAL FIELD

The present invention relates to a guide-layer separated optical recording medium having multiple recording layers and an optical recording medium drive apparatus and a recording layer access method for the recording medium.

BACKGROUND ART

As well known in this field, optical disks having multiple recording layers include a guide-layer integrated disk having a recording layer and a guide layer formed in the same layer for each recording layer and a guide-layer separated disk having recording layers and a guide layer formed separately from the recording layers. The guide layer is a layer in which a servo guide structure or signal, containing position (address) information, is formed as a guide track.

Regarding the guide-layer integrated disk, even non-recorded portions with no recording layer information recorded can be provided with tracking control using the guide track integrated with the recording layer, enabling information to be recorded on the track specified by the guide track (see Patent References 1 and 2). This disk also has an advantage of being capable of reading and writing information using a single laser beam.

On the other hand, the guide-layer separated disk requires a servo laser beam for reading on a guide track in the guide layer and a read/write laser beam for writing information or reading recorded information on the recording layer. To record information on one recording layer, while tracking control is provided to move the focal position of the servo laser beam along the guide track of the guide layer, the read/write laser beam is focused on one recording layer to write information (see Patent Reference 3). Accordingly, the optical disk drive apparatus includes a servo optical system for irradiating the guide layer with the servo laser beam. The apparatus also includes a read/write optical system for irradiating the recording layer with the read/write laser beam to detect the reflected beam using the same objective lens as that of the servo optical system to detect the reflected beam. This guide-layer separated disk is formed of simple structure recording layers stacked in layers, thus allowing optical disks to be manufactured with ease at reduced costs. The disk also has an advantage, over the guide-layer integrated disk, of having an increased recording capacity because multiple recording layers can be formed with ease.

To write information or read recorded information on an optical disk with multiple recording layers, a desired recording layer to be read or written has to be quickly accessed. That is, it has to be quickly determined for the guide-layer integrated disk whether the recording layer on which a single laser beam has been generally focused is the desired recording layer, and for the guide-layer separated disk whether the recording layer on which the read/write laser beam has been generally focused is the desired recording layer. Note that as used herein, the expression, "to access the recording layer" refers to a series of operations for focusing a laser beam on the desired recording layer by focus servo control.

Patent Reference 1 discloses that when preformats, including addresses or the like, of each recording layer of the optical disk are the same for each recording layer, the preformats are mutually shifted in the direction of rotation of the disk between each recording layer. Upon recording or reproducing, the amount of phase shift from a reference recording layer is detected to know which recording layer is being currently accessed.

Furthermore, Patent Reference 2 also discloses that part of each recording layer of the optical disk is provided with a reflective film coated portion having a high reflectivity that allows for focus servo retraction, and the reflective film coated portion of each recording layer is located at different positions.

Related Patent Applications
Patent Reference 1: Japanese Patent Application Publication No. 2002-334448
Patent Reference 2: Japanese Patent Application Publication No. 2005-122862
Patent Reference 3: Japanese Patent Application Publication No. Heisei 4-301226

DISCLOSURE OF THE INVENTION

Problems to be Solved by the Invention

In the guide-layer separated disk, although not shown in Patent Reference 3, for example, when the servo laser beam is focused on the guide layer by an objective lens, a beam expander provided in the read/write optical system is adjusted to a predetermined condition for each recording layer. This allows for jumping the focus of the read/write laser beam to the recording layer for focusing operations. However, since no address can be referred to at a non-recorded recording layer with no tracks formed, conventional drive apparatuses had no mechanism to ensure that a desired recording layer has been accessed. On the other hand, even to access recorded recording layers, it had to be repeated to read the data and check the address, thus causing the access to the desired recording layer to be time consuming.

The present invention was developed in view of the aforementioned problems as an example. It is an object of the invention to provide a guide-layer separated optical recording medium, an optical recording medium drive apparatus, and a recording layer access method, which enable quick access to and confirm a desired recording layer.

Means for Solving the Problems

A guide-layer separated optical recording medium according to the present invention of claim 1 comprises a guide layer with a guide track formed therein, and a plurality of recording layers, the guide layer and the plurality of recording layers being deposited separately from each other, wherein a layer position information region for indicating position information of each of the recording layers, is formed on the guide track within a different range of the guide layer for each of the recording layers, each of the recording layers includes a preformat region having a predetermined signal written on a record track along the guide track, and the preformat region on each of the recording layers is provided in a region corresponding to the layer position information region.

An optical recording medium drive apparatus according to the present invention of claim 4 is an apparatus for driving a guide-layer separated optical recording medium including a guide layer with a guide track formed therein and a plurality of recording layers, the guide layer and the plurality of recording layers being deposited separately from each other, wherein: a layer position information region for indicating position information of each of the recording layers, is formed on the guide track within a different range of the guide layer for each of the recording layers; each of the recording layers includes a preformat region having a predetermined signal written on a record track along the guide track; and the preformat region on each of the recording layers is provided in a region corresponding to the layer position information region, the drive apparatus comprising: a servo optical system for irradiating the optical recording medium with a first laser beam for a servo via an objective lens to detect a reflected beam from the guide layer; a read/write optical system for irradiating the optical recording medium with a second laser beam for reading or writing via the objective lens to detect a reflected beam from one of the plurality of recording layers; reproduced-signal determination means for determining whether a reproduced signal has been obtained, based on a detection level of a reflected beam from the preformat region by the read/write optical system; information read means for acquiring position information of one of the plurality of recording layers based on a detection level of a reflected beam from the layer position information region by the servo optical system; and control means for allowing the second laser beam to access a desired one of the plurality of recording layers in accordance with a determination result by the reproduced-signal determination means and the read position information by the information read means.

A recording layer access method according to the present invention of claim 7 is a method of an optical recording medium drive apparatus for driving a guide-layer separated optical recording medium including a guide layer with a guide track formed therein and a plurality of recording layers, the guide layer and the plurality of recording layers being deposited separately from each other, wherein: a layer position information region for indicating position information of each of the recording layers, is formed on the guide track within a different range of the guide layer for each of the recording layers; each of the recording layers includes a preformat region having a predetermined signal written on a record track along the guide track; and the preformat region on each of the recording layers is provided in a region corresponding to the layer position information region, and wherein the drive apparatus includes: a servo optical system for irradiating the optical recording medium with a first servo laser beam for a servo via an objective lens to detect a reflected beam from the guide layer; and a read/write optical system for irradiating the optical recording medium with a second laser beam for reading or writing via the objective lens to detect a reflected beam from one of the plurality of recording layers, the method comprising: a reproduced-signal determination step of determining whether a reproduced signal has been obtained, based on a detection level of a reflected beam from the preformat region by the read/write optical system; an information read step of acquiring position information of one of the plurality of recording layers based on a detection level of a reflected beam from the layer position information region by the servo optical system; and a control step of allowing the second laser beam to access a desired one of the plurality of recording layers in accordance with a determination result from the reproduced-signal determination step and the read position information from the information read step.

BEST MODE FOR CARRYING OUT THE INVENTION

The optical recording medium according to the present invention of claim 1 is configured such that on the guide track, a layer position information region for each recording layer, indicating the position information of the recording layer, is formed within mutually different ranges of the guide layer, and a preformat region corresponding to the layer position information region is formed for each recording layer. Accordingly, when the layer position information region of the guide layer is read to thereby acquire the position information of the desired recording layer, it can be determined whether the desired recording layer has been accessed in accordance with the presence of the reproduced signal of the preformat region. Thus, using such an optical recording medium, it is possible to quickly access and confirm the desired recording layer.

Furthermore, the optical recording medium drive apparatus of the present invention of claim 4 and such a recording layer access method of the present invention of claim 7 are configured to obtain a reproduced signal based on the detection level of the reflected beam from the preformat region of the optical recording medium by the read/write optical system as well as to acquire the position information of any one of the multiple recording layers based on the detection level of the reflected beam from the layer position information region of the optical recording medium by the servo optical system. Accordingly, when the layer position information region of the guide layer is read to thereby acquire the position information of the desired recording layer, it can be determined whether the desired recording layer has been accessed in accordance with the presence of the reproduced signal of the preformat region. Thus, using such an optical recording medium drive apparatus and such a recording layer access method, it is possible to quickly access and confirm the desired recording layer.

BRIEF DESCRIPTION OF THE DRAWINGS

FIGS. 1A and 1B are views illustrating each layer of a guide-layer separated optical disk of the present invention;

FIGS. 6A and 6B are views illustrating each layer of a guide-layer separated optical disk according to another embodiment of the present invention;

FIGS. 11A and 11B are views illustrating each layer of a guide-layer separated optical disk according to another embodiment of the present invention.

EMBODIMENTS

Now, the present invention will be described below in more detail with reference to the accompanying drawings in accordance with the embodiments.

Figure 2:
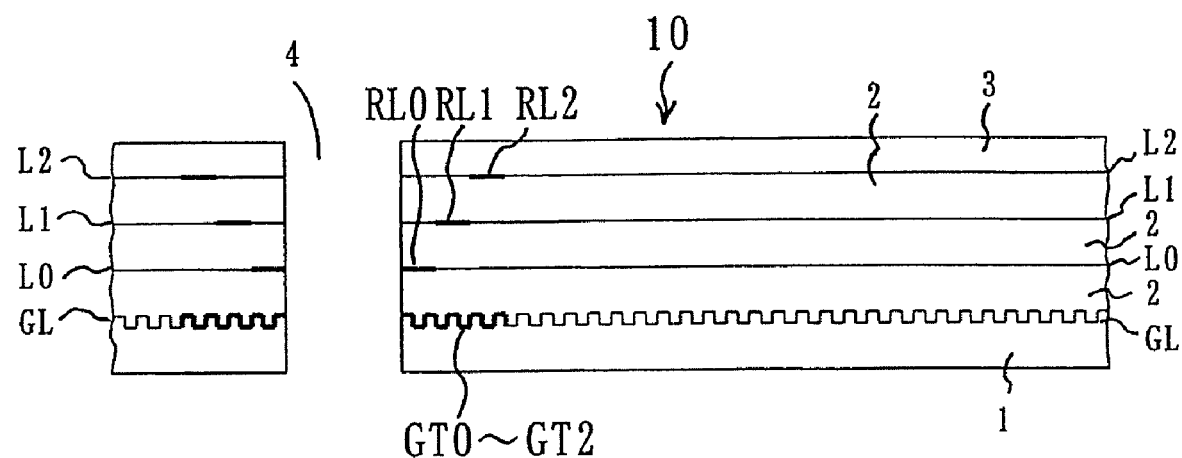
FIG. 2 is a partially sectional view illustrating the optical disk of FIG. 1A.

FIGS. 1A and 1B show an optical disk 10, which has three recording layers, as an optical recording medium according to a first embodiment of the present invention. As shown in FIG. 2, the optical disk 10 has a stacked layer structure which is formed of a glass substrate 1, a guide layer GL, three recording layers L0 to L2, inter-layers 2, and a protection layer 3. The guide layer GL is formed on the substrate 1 and made of a reflective film. The recording layers L0 to L2 are each made of a translucent reflective film and a recording film, and formed in that order from the guide layer GL side. The inter-layer 2 is made of UV cured resin and formed between each of the guide layer GL and the recording layers L0 to L2. The reflective film of the guide layer GL is made of metal such as Au, the recording film of the recording layers L0 to L2 is made of an organic material, for example, azo dyes, and the translucent reflective film is made of dielectric, for example, $Nb_2O_5$ or $TiO_2$. The protection layer 3 is formed on the recording layer L2, serving as the disk surface upon which the laser beam is incident. At the center of the optical disk 10, there is formed a clamp hole 4 that penetrates the disk.

The guide layer GL has a guide track formed on the entire surface, with address information written on the guide track.

As shown in FIG. 1A, in the range, where the guide track is formed, from the innermost circumference of the guide layer GL to the predetermined distance in the radial direction of the disk, annular layer position information regions GT0 to GT2 associated with the recording layers L0 to L2 are continuously formed. The layer position information regions GT0 to GT2 each contain a guide track of about 10 tracks. The layer position information region GT0 stores address information regarding the recording layer L0, the layer position information region GT1 stores address information regarding the recording layer L1, and the layer position information region GT2 stores address information regarding the recording layer L2.

As shown in FIG. 1B, the recording layer L0 has an annular preformat region RL0, formed at the same layer position as the layer position information region GT0 in the radial direction of the disk. The recording layer L1 has an annular preformat region RL1 formed at the same position as the layer position information region GT1 in the radial direction. The recording layer L2 has an annular preformat region RL2 formed at the same position as the layer position information region GT2 in the radial direction of the disk. Each of the preformat regions RL0 to RL2 has a track which has stored information regarding the layer in advance. The information regarding the layer may include, for example, an address (layer number), TOC, gain/offset regulation value such as a reproduced signal or the like, aberration correction value by a movable expander lens or the like, write strategy, or recorded/non-recorded boundary position.

Figure 3:
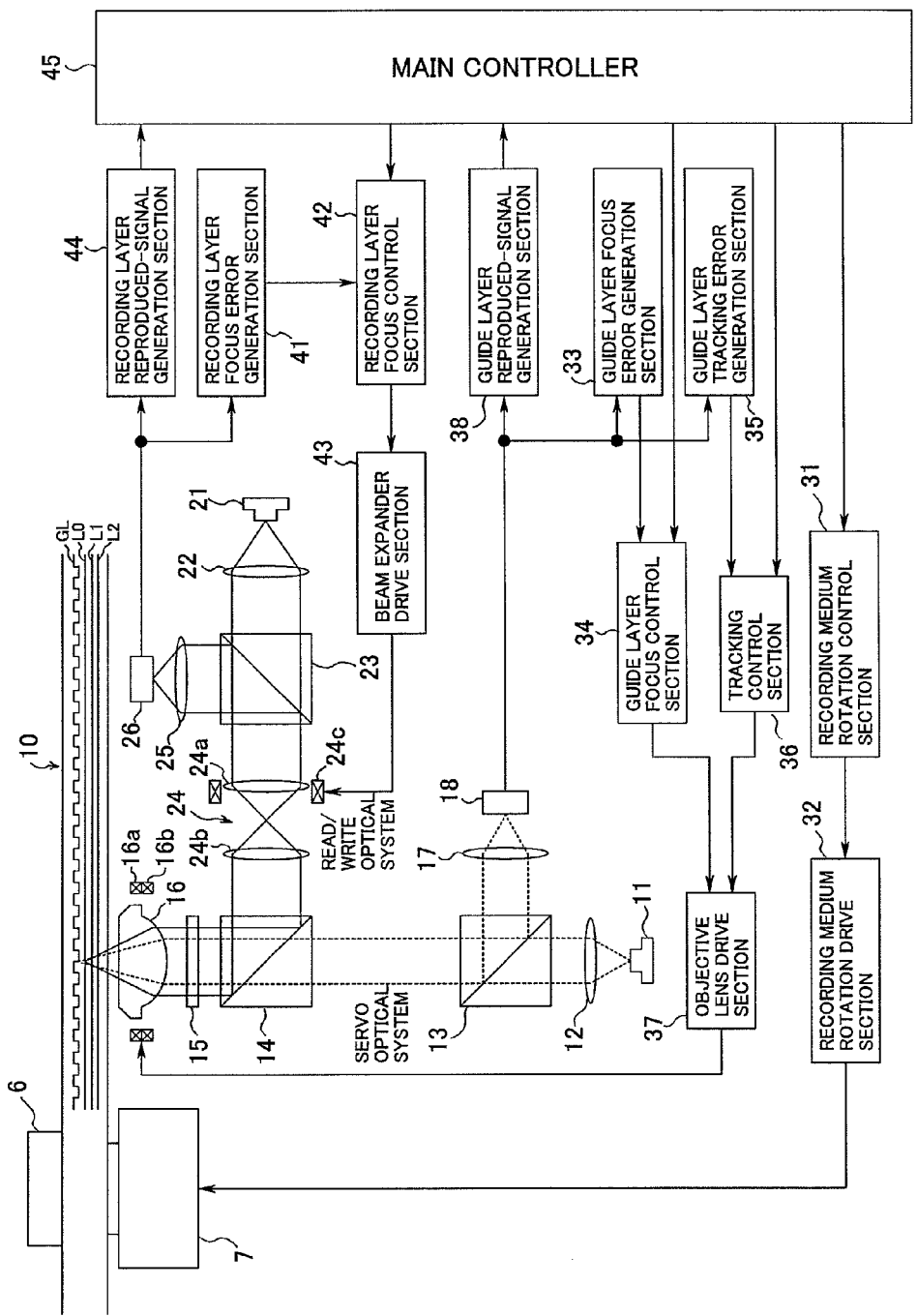
FIG. 3 is a view illustrating the configuration of an optical disk drive apparatus of the present invention.

FIG. 3 illustrates the configuration of an optical disk drive apparatus according to the present invention. The optical disk drive apparatus is to optically read or write information on the aforementioned optical disk 10, and includes a disk drive assembly, an optical system, and a signal processing assembly.

The disk drive assembly is constructed to apparently sandwich and thereby hold the optical disk 10 with a clamp mechanism 6, allowing a spindle motor 7 to rotate the disk 10.

The optical system is further divided into a servo optical system and a read/write optical system.

The servo optical system includes a light source 11, a collimator lens 12, a beam splitter 13, a dichroic prism 14, a wavelength plate 15, an objective lens 16, a condenser lens 17, and a photodetector 18.

The light source 11 is a semiconductor laser device for emitting a servo laser beam (first laser beam) at a wavelength of 660 nm. The light source 11 is driven by a servo light source drive section (not shown). The collimator lens 12 collimates the servo laser beam emitted by the light source 11 and provides the resulting collimated beam to the beam splitter 13. The beam splitter 13 provides the collimated laser beam supplied from the collimator lens 12 to the dichroic prism 14 with no changes made to the beam. The dichroic prism 14 is a composite prism having composite sides which have different reflective and transmissive characteristics depending on optical wavelengths. The dichroic prism 14 is characterized to reflect the read/write laser beam at a wavelength near 405 nm, whereas it transmits the guide laser beam or the guide beam at a wavelength near 660 nm. Therefore, the dichroic prism 14 supplies the servo laser beam incident from the beam splitter 13 to the wavelength plate 15 with no changes made to the beam.

The wavelength plate 15 is provided so that a laser beam passes therethrough twice, i.e., when it goes to the optical disk 10 and comes back from the disk 10 with the beam polarized by 90 degree. This is to cause the return read/write beam from the dichroic prism 14 to the splitter surface of the beam splitter 13 to be turned into an s-polarization beam. Accordingly, the beam splitter 13 operates to reflect the beam in the return path. This also holds true for the return read/write beam at a beam splitter 23 of the read/write optical system, to be described later. Furthermore, the wavelength plate 15 employed has a wide bandwidth and acts as a ¼ wavelength plate at least for the wavelength of the beam emitted from the light source 11.

The objective lens 16 is provided with a focus actuator 16a for displacing the lens 16 in the direction of the optical axis and a tracking actuator 16b for displacing the lens 16 in a direction perpendicular to the optical axis. Thus, the lens 16 can be electrically controlled for inching during focusing and tracking operations.

The objective lens 16 can cause the servo laser beam to converge on the guide layer of the optical disk 10 using the focus actuator 16a as well as the read or write laser beam to be focused on any one of the multiple recording layers L0 to L2. It can also use the tracking actuator 16b to locate the beam spot of the servo laser beam on the guide track of the guide layer GL, simultaneously allowing the position corresponding to the guide track to be irradiated with the beam spot of the read or write laser beam in that recording layer.

The servo laser beam reflected on the guide layer of the optical disk 10 returns to the dichroic prism 14 as a collimated laser beam via the objective lens 16 and the wavelength plate 15. The dichroic prism 14 supplies the reflected servo laser beam to the beam splitter 13 with no changes made to the beam. The beam splitter 13 reflects the laser beam from the dichroic prism 14 generally at an angle of 90 degrees with respect to the direction of incidence of the beam, allowing the beam to be supplied to a condenser lens 17. The condenser lens 17 allows the reflected servo laser beam to converge on the light-receiving surface of the photodetector 18 and form a spot thereon. The photodetector 18 has, for example, a four-way split light-receiving surface and generates a voltage signal at a level associated with the strength of the light beam received on each split surface.

The read/write optical system shares the dichroic prism 14, the wavelength plate 15, and the objective lens 16 of the servo optical system, and additionally includes a light source 21, a collimator lens 22, the beam splitter 23, a beam expander 24, a condenser lens 25, and a photodetector 26.

The light source 21 is a semiconductor laser device for emitting a read or write blue laser beam (second laser beam) at a wavelength of 405 nm. The light source 21 is driven by a read/write light source drive section (not shown). The laser beam emitted from the light source 21 is adjusted to be a p-polarization beam. The collimator lens 22 collimates the laser beam emitted by the light source 21 and supplies the resulting collimated beam to the beam splitter 23. The beam splitter 23 is a polarizing beam splitter (PBS) and has a splitter surface angled at 45 degrees relative to the incidence plane of the laser beam from the collimator lens 22, allowing the p-polarization collimated laser beam supplied from the collimator lens 22 to pass through the splitter surface, as it is, and go into the beam expander 24.

The beam expander 24, made up of Keplerian expander lenses, includes first and second correcting lenses 24a and 24b, with the first correcting lens 24a to be driven by an actuator 24c and thereby movable in the direction of the optical axis. Initially, the spacing of the lenses is adjusted so that an incident collimated beam is emitted as a collimated beam. The correcting lens 24a can be displaced in the direction of the optical axis to diverge or converge the transmitted beam, thereby providing spherical aberration and a focus difference for the servo beam of the read/write beam converged by the objective lens 16. That is, the position of the first correcting lens 24a is changed to vary the distance between the first and second correcting lenses 24a and 24b, providing focus control and spherical aberration correction to each recording layer of the optical disk 10. The beam expander 24 can be replaced by other spherical aberration correction means such as a Galilean expander lens or a liquid crystal device.

As described above, the dichroic prism 14 reflects wavelengths near 405 nm or the wavelength of the read/write laser beam, so that the read/write laser beam is reflected and directed to the optical disk 10.

As described above, the objective lens 16 can focus the read or write laser beam on any one of the multiple recording layers L0 to L2.

The read/write laser beam reflected on any recording layer of the optical disk 10 passes through the objective lens 16, the wavelength plate 15, the dichroic prism 14, and the beam expander 24 to return to the beam splitter 23 as a collimated laser beam. The beam splitter 23 causes the reflected laser beam or an s-polarization beam to be reflected on the splitter surface generally at an angle of 90 degrees with respect to the direction of its incidence and supplied to the condenser lens 25. The condenser lens 25 causes the reflected laser beam to converge on the light-receiving surface of the photodetector 26 and form a spot thereon. The photodetector 26 has, for example, a four-way split light-receiving surface and generates a voltage signal at a level associated with the strength of the light beam received on each split surface.

It is important to note that the aforementioned optical system is made movable by a transport drive section (not shown) in the radial direction of the optical disk 10.

The signal processing assembly includes a recording medium rotation control section 31, a recording medium rotation drive section 32, a guide layer focus error generation section 33, a guide layer focus control section 34, a guide layer tracking error generation section 35, a tracking control section 36, an objective lens drive section 37, a guide layer reproduced-signal generation section 38, a recording layer focus error generation section 41, a recording layer focus control section 42, a beam expander drive section 43, a recording layer reproduced-signal generation section 44, and a main controller 45.

The recording medium rotation control section 31 controls the recording medium rotation drive section 32 in accordance with an instruction from the main controller 45. When driving the recording medium, the recording medium rotation drive section 32 drives a motor 7 to thereby rotate the optical disk 10. The recording medium rotation drive section 32 provides spindle servo control in order to rotate the optical disk 10 at a constant linear velocity.

The guide layer focus error generation section 33 generates a guide layer focus error signal in accordance with the output voltage signal from the photodetector 18. To generate the focus error signal, it is possible to employ a well-known signal generation method such as the astigmatism method. The guide layer focus error signal has an S-shaped characteristic that exhibits the zero level when the servo beam is focused on the guide layer GL.

The guide layer focus control section 34 provides control in accordance with an instruction from the main controller 45, and during the focus servo control, generates a focus control signal so that the guide layer focus error signal is brought to the zero level. The focus control signal is supplied to the objective lens drive section 37 to allow the objective lens 16 to be controlled for focusing operations.

The guide layer tracking error generation section 35 generates a guide layer tracking error signal in accordance with the output voltage signal from the photodetector 18. The guide layer tracking error signal is indicative of the deviation of the guide laser beam at the converged beam spot position on the guide layer GL from the center of the guide track. The guide layer tracking error generation section 35 has an output connected with the tracking control section 36. The tracking control section 36 provides tracking servo control in accordance with an instruction from the main controller 45, receives the guide layer tracking error signal generated by the guide layer tracking error generation section 35, and supplies a tracking control signal to the objective lens drive section 37 to allow the objective lens 16 to be controlled for tracking operations. The tracking control signal is generated so that the guide tracking error signal is brought to the zero level.

The objective lens drive section 37 drives the focus actuator 16a in accordance with the focus control signal from the guide layer focus control section 34 to move the objective lens 16 in the direction of the optical axis, thereby causing the servo beam to converge and the beam spot to be focused on the guide layer GL. Furthermore, the objective lens drive section 37 drives the tracking actuator 16b to move the objective lens 16 in the radial direction of the optical disk 10 perpendicular to the optical axis in accordance with the tracking control signal from the tracking control section 36. This allows the servo beam spot to follow the guide track of the guide layer GL for tracking operations.

The guide layer reproduced-signal generation section 38 reads the recorded data on the guide track in accordance with the output voltage signal from the photodetector 18 to generate its address information. The address information is used to identify the recorded layer.

The recording layer focus error generation section 41 generates a recording layer focus error signal in accordance with the output voltage signal from the photodetector 26. To generate the recording layer focus error signal, it is possible to employ a well-known signal generation method such as the astigmatism method. The recording layer focus error signal has an S-shaped characteristic that exhibits the zero level when the read/write beam is focused on each of the recording layers L0 to L2. The recording layer focus error signal generation section 41 has an output connected with the recording layer focus control section 42. The recording layer focus control section 42 supplies a recording layer focus control signal to the beam expander drive section 43 to control it in accordance with the recording layer focus error signal. The recording layer focus control signal is generated so that the recording layer focus error signal is brought to the zero level.

The beam expander drive section 43 drives the actuator 24c in accordance with the recording layer focus control signal to change the distance between the correcting lenses 24a and 24b of the beam expander, thereby adjusting the beam directed to the objective lens 16 to diverge or converge. This allows for varying the position of the converged read/write beam relative to the position of the converged servo beam on the optical axis. That is, the voltage level corresponding to the desired recording layer is supplied to the beam expander drive section 43 as the recording layer focus control signal. This allows the read/write beam to converge on any one of the recording layers that is spaced apart from the guide layer GL by the desired distance.

The recording layer reproduced-signal generation section 44 reads a signal stored in any one recording layer in accordance with the output voltage signal from the photodetector 26.

The main controller 45 provides on/off control to the disk rotation control by the recording medium control section 31, the focus servo control by the guide layer focus control section 34, the tracking servo control by the tracking control section 36, and the focus servo control by the recording layer focus control section 42.

The optical disk drive apparatus configured in this manner operates in two modes: a recording mode for recording information on any one recording layer of the optical disk 10 and a reproducing mode for reproducing the information recorded on the recording layer of the optical disk 10.

Now, a description will be made as to how the read/write laser beam accesses the desired recording layer in the recording mode of the optical disk drive apparatus in order to record information on the desired recording layer of the optical disk 10.

Figure 4:
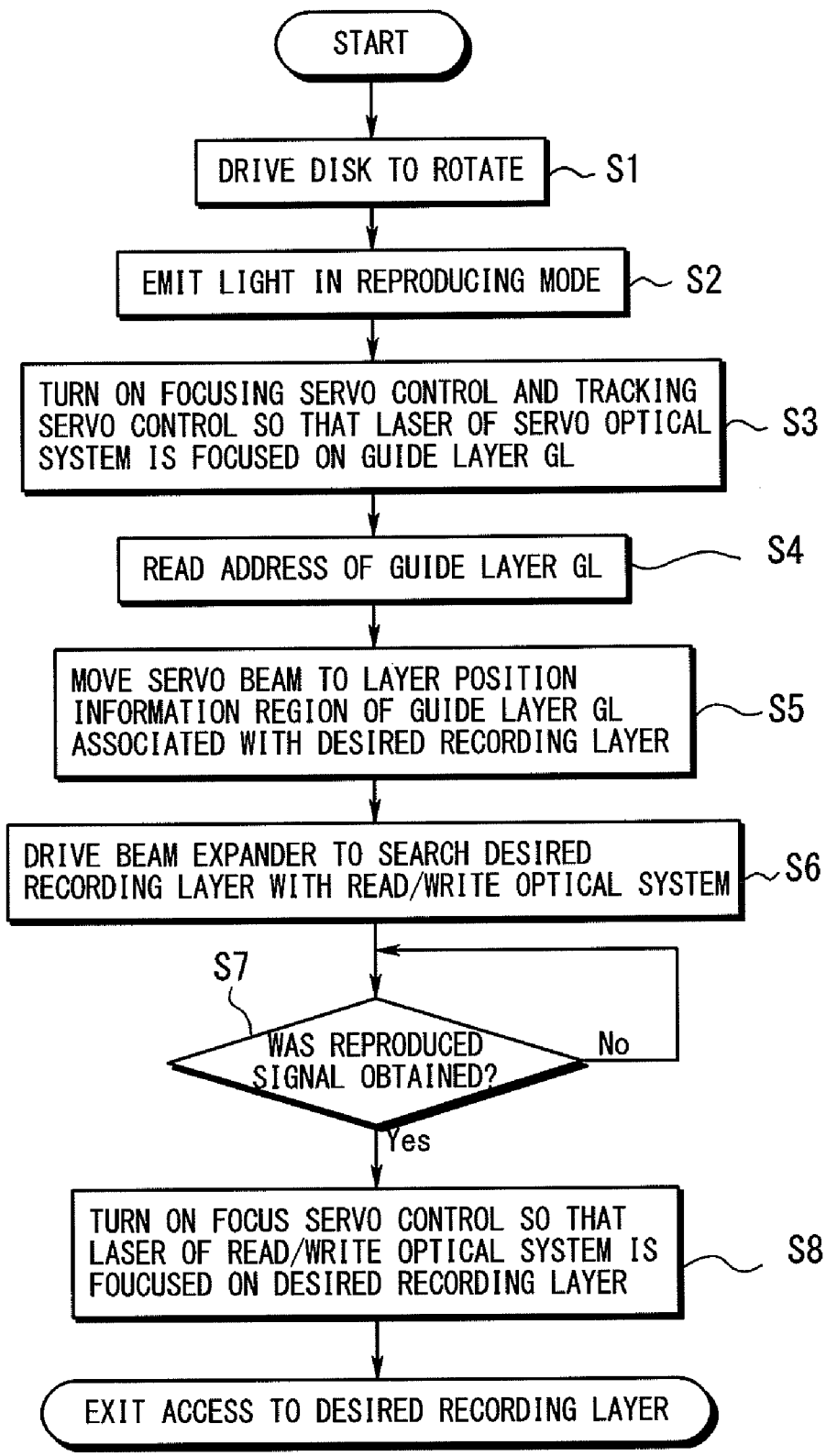
FIG. 4 is a flowchart showing an access operation to a desired recording layer of the optical disk of FIG. 1A.

The main controller 45 starts the recording mode of operation in accordance with a write command from a manipulation section (not shown). As shown in FIG. 4, first, the controller 45 provides a rotation initiation command to the recording medium rotation control section 31 to drive and rotate the optical disk 10 (step S1), supplying a light-emission drive command to the aforementioned read/write light source drive section and the guide light source drive section (step S2). The servo light source drive section drives the light source 11 to emit a servo laser beam, while the read/write light source drive section drives the light source 21 with the read power for the read laser beam to be emitted. Note that the steps S1 and S2 are skipped if the optical disk 10 has been already driven to rotate and the light sources 11 and 21 driven to emit light.

The main controller 45 commands the guide layer focus control section 34 to turn on focus servo control and commands the tracking control section 36 to turn on tracking servo control (step S3). When having been turned on, the focus servo control allows for closing the focus servo loop which is made up of the servo optical system, the guide layer focus error generation section 33, the guide layer focus control section 34, and the objective lens drive section 37. Accordingly, the guide layer focus control section 34 generates the guide layer focus control signal so that the focus error signal generated at the guide layer focus error signal generation section 33 is brought to the zero level, and the objective lens drive section 37 drives the focus actuator 16a. Thus, since the position of the objective lens 16 in the direction of the optical axis is controlled, the servo laser beam is focused on the guide layer GL of the optical disk 10, thus allowing the converged beam spot to be formed on the guide layer GL. On the other hand, when having been turned on, the tracking servo control allows for closing a tracking servo loop which is made up of the servo optical system, the guide layer tracking error generation section 35, the tracking control section 36, and the objective lens drive section 37. Accordingly, the tracking control section 36 generates the tracking control signal so that the tracking error signal generated at the guide layer tracking error generation section 35 is brought to the zero level, and the objective lens drive section 37 drives the tracking actuator 16b. Thus, since the position of the objective lens 16 in the radial direction of the disk is controlled, the converged beam spot of the servo laser beam is located on the guide track of the guide layer GL of the optical disk 10.

The main controller 45 reads the address of the current track of the guide layer GL from the output signal of the guide layer reproduced-signal generation section 38 (step S4), and in accordance with the resulting current track address, moves the spot light of the servo beam to the layer position information region associated with the desired recording layer (any one of the recording layers L0 to L2) (step S5). If the desired recording layer is, for example, the recording layer L0, the spot light of the servo beam is moved to the layer position information region GT0. The spot light of the servo beam can be jumped to move by controlling the aforementioned transport drive section.

After the step S5 is followed, the main controller 45 issues a search command to the recording layer focus control section 42 so that the read/write laser beam is focused on the desired recording layer (step S6). In accordance with the search command in step S6, the recording layer focus control section 42 first outputs to the beam expander drive section 43 the recording layer focus control signal that varies in level to drive the actuator 24c and gradually move the correcting lens 24a from one end of its movement range to the other. This allows for moving the position of the correcting lens 24a to the position associated with the desired recording layer. When the read/write laser beam is focused on any one recording layer, the recording layer focus error signal delivered from the recording layer focus error signal generation section 41 crosses zero.

After the step S6 has been followed, the main controller 45 determines whether a reproduced signal for the desired recording layer has been obtained (step S7). If the read/write laser beam is successfully focused on the desired recording layer, the information stored in the preformat region formed on the desired recording layer is obtained as a modulated reproduced signal from the recording layer reproduced-signal generation section 44. Suppose that the desired recording layer is, for example, the recording layer L0. In this case, when the converged beam spot of the servo laser beam is located within the layer position information region GT0, the reproduced signal is obtained from the recording layer reproduced-signal generation section 44 because the read/write laser beam is to read the information stored in the preformat region RL0 of the recording layer L0. Here, if the converged beam spot of the read/write laser beam is generally located on a recording layer other than the recording layer L0, the read/write laser beam does not irradiate the preformat region and thus the reproduced signal cannot be obtained. As shown in FIGS. 1A and 2, this is due to the fact that the positions at which the preformat region of each of the recording layers L0 to L2 is formed are different from each other in the radial direction of the disk. Accordingly, in step S7, it is determined whether the read/write laser beam is focused on the desired recording layer by determining whether the reproduced signal has been obtained. Here, since the determination of whether it is the desired recording layer is made depending on the availability of the reproduced signal, it is not necessary to read the recorded data of the preformat region.

Figure 5:
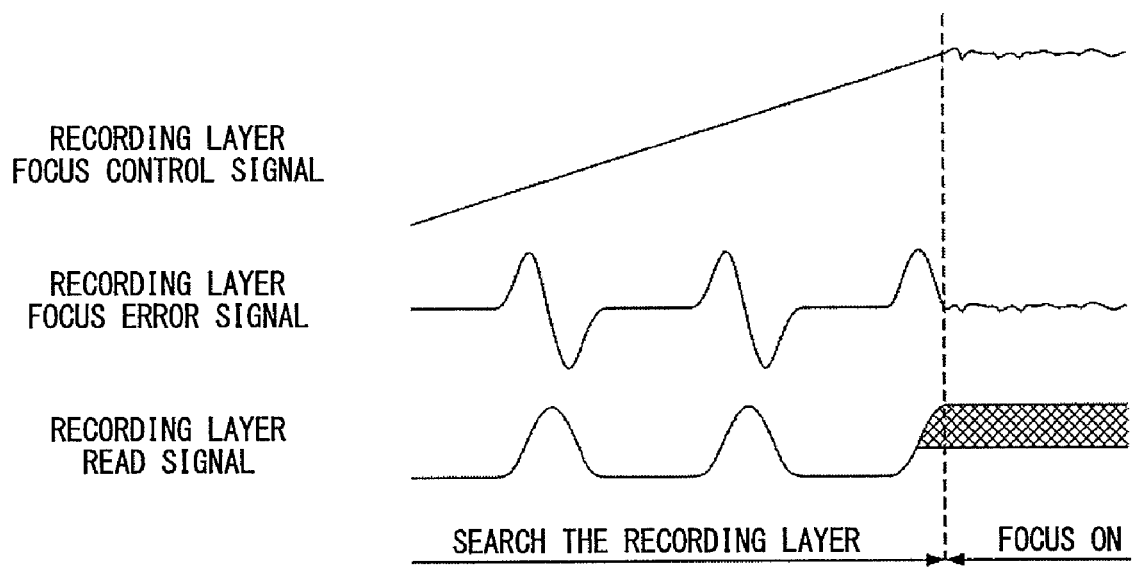
FIG. 5 is a waveform diagram showing variations in a recording layer focus control signal, a recording layer focus error signal, and a reproduced signal during the access operation of FIG. 4.

FIG. 5 shows how the recording layer focus control signal, the recording layer focus error signal, and the reproduced signal vary from the time at which step S6 is carried out to focus the read/write laser beam on the desired recording layer until the reproduced signal is obtained. Here, the recording layer focus control signal has a level associated with the position of the correcting lens 24a. The recording layer focus error signal has amplitudes when the focus of the read/write laser beam crosses the recording layer, and the zero crossing point between the positive amplitude and the negative amplitude indicates that the focus is located on the recording layer. In the example of FIG. 5, the focus has reached the desired recording layer across two recording layers. As shown in FIG. 5, the reproduced signal for the recording layer contains multiple frequencies when the read/write laser beam is focused on the layer position information region. The reproduced signal is at a level when the focus of the read/write laser beam crosses a non-recorded recording layer. The reproduced signal can be thus determined to have been obtained by reading the preformat region of the desired recording layer when the level of the predetermined frequency component other than the frequency component of the signal used for the crossing has exceeded a threshold value. The determination can be made before reading the recorded data of the preformat region in the recording layer.

If the reproduced signal has been obtained in step S7, the main controller 45 commands the recording layer focus control section 42 to turn on the focus servo control (step S8). When having been turned on, the focus servo control allows for closing the focus servo loop which is made up of the read/write optical system, the recording layer focus error generation section 41, the recording layer focus control section 42, and the beam expander drive section 43. Accordingly, the recording layer focus control section 42 generates the recording layer focus control signal so that the focus error signal generated at the recording layer focus error signal generation section 41 is brought to the zero level, and the beam expander drive section 43 drives the actuator 24c. Thus, the position of the correcting lens 24a, i.e., the distance between the correcting lenses 24a and 24b is controlled, thereby ensuring that the read/write laser beam is focused on the desired recording layer of the optical disk 10.

After the step S8 has been carried out, the main controller 45 is to move on to a writing operation on a non-recorded area of the desired recording layer. The writing operation is performed while the guide layer focus servo control and the guide layer tracking servo control are being exercised and the recording layer focus servo control is being provided to the desired recording layer as described above. Accordingly, while the servo laser beam traces the guide track of the guide layer GL, the read/write laser beam converges on the desired recording layer and the light source 21 is driven with the write power (greater than the aforementioned read power). The light source 21 is thus modulated in accordance with the recorded data so as to perform recording. This allows for forming record tracks on the desired recording layer along the guide track of the guide layer GL.

In the first embodiment described above, the layer position information regions GT0 to GT2 of the guide layer GL of the optical disk 10 and the preformat regions RL0 to RL2 of the recording layers L0 to L2 are located corresponding to each other in the same disk radius range, respectively, with the regions preformatted. Accordingly, before the address is read from the reproduced signal of the layer position information region on the recording layer, each recording layer can be determined in accordance with the reproduced signal of the layer position information region of the guide layer GL, allowing for accessing the desired recording layer in a short period of time. Furthermore, since the preformat regions RL0 to RL2 of the recording layers L0 to L2 are formed in accordance with the track of the guide layer GL, the tracking servo control for the guide layer GL hardly causes the read/write laser beam to shift from the track of the preformat regions RL0 to RL2. This allows for making the determination of the recording layer with no problem even if the preformat regions RL0 to RL2 are reduced in width. Furthermore, sufficient non-recorded areas are ensured on each of the recording layers L0 to L2.

Immediately after the preformat region of the desired recording layer has been accessed, information is acquired from the layer position information region of the guide layer GL and initial adjustments or initial settings are provided to the drive apparatus for the desired recording layer, thereby performing write and read operations with stability. The information required for each recording layer can be stored in the layer position information region of the guide layer GL. This facilitates access to the recording layer and retrieval of information, and shortens the time required before a writing or reading operation.

It is important to note that as the method for writing on the layer position information regions GT0 to GT2 of the guide layer GL and the preformat regions RL0 to RL2 of the recording layers L0 to L2, a preformatter may be used for recording before shipment or a drive apparatus may be used to record on the guide layer GL and each of the recording layers L0 to L2 as the formatting of the optical disk.

Furthermore, in the aforementioned first embodiment, an address position in a radial direction of the disk corresponding to the desired recording layer is reached and then the focus is searched on the desired recording layer. Alternatively, the focus may be retracted towards the recording layer at the predetermined radial position. Then, the correspondence between the preformat region of the recording layer and the address of the guide layer maybe determined, and the recording layer on which the read/write laser beam has been focused can be confirmed. After that, the focus of the read/write laser beam may be jumped to access the desired recording layer.

Figure 7:
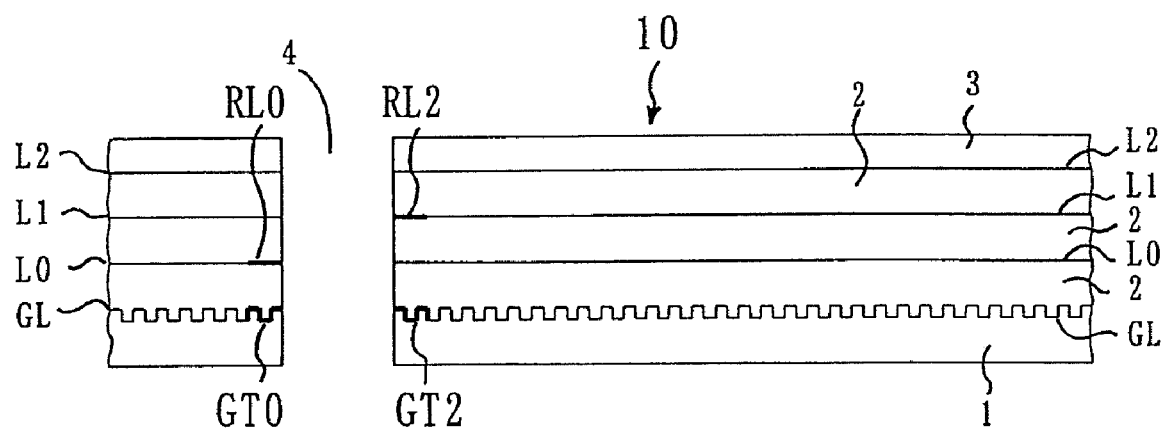
FIG. 7 is a partially sectional view illustrating the disk of FIG. 6A.

FIGS. 6A and 6B show an optical disk 10 according to a second embodiment of the present invention. As shown in FIG. 7, the optical disk 10 is made up of a glass substrate 1, a guide layer GL, three recording layers L0 to L2, inter-layers 2, and a protection layer 3. The guide layer GL is formed on the substrate 1. The recording layers L0 to L2 are each made of a reflective film and formed in that order from the guide layer GL side. The interlayer 2 is formed between each of the guide layer GL and the recording layers L0 to L2. The optical disk 10 is made of the same material as that shown in FIG. 2.

The guide layer GL has a guide track formed across its entire surface, with address information stored on the guide track.

As shown in FIG. 6A, for example, in the range of 10 circular guide tracks formed in the radial direction from the innermost circumference of the guide layer GL, the layer position information regions GT0 to GT2 associated respectively with the recording layers L0 to L2 are formed at intervals of 120 degrees. The layer position information region GT0 stores information regarding the recording layer L0, the layer position information region GT1 stores information regarding the recording layer L1, and the layer position information region GT2 stores information regarding the recording layer L2.

As shown in FIG. 6B, on the innermost circumference of the recording layer L0, the preformat region RL0 having the same shape as that of the layer position information region GT0 of the guide layer GL is formed at the same position as that of the layer position information region GT0. Similarly, on the innermost circumference of the recording layer L1, the preformat region RL1 having the same shape as that of the layer position information region GT1 of the guide layer GL is formed at the same position as that of the layer position information region GT1. Furthermore, on the innermost circumference of the recording layer L2, the preformat region RL2 having the same shape as that of the layer position information region GT2 of the guide layer GL is formed at the same position as that of the layer position information region GT2. That is, the layer position information regions GT0 to GT2 and the preformat regions RL0 to RL2 correspond respectively to each other in the same angular range on the optical disk 10. The preformat regions RL0 to RL2 are a preformat region in which tracks are formed. Like the layer position information regions GT0 to GT2, the preformat regions RL0 to RL2 each have tracks on which the information regarding the layer is pre-stored. The information regarding the layer may include, for example, the address (layer number), TOC, gain/offset regulation values such as the reproduced signal, aberration correction values such as for the movable expander lens, write strategies, or recorded/non-recorded boundary positions.

Now, a description will be made to the operation of the read/write laser beam accessing to the desired recording layer of the optical disk 10 of FIGS. 6A and 7 to write information on the desired recording layer in the recording mode of the optical disk drive apparatus shown in FIG. 3.

Figure 8:
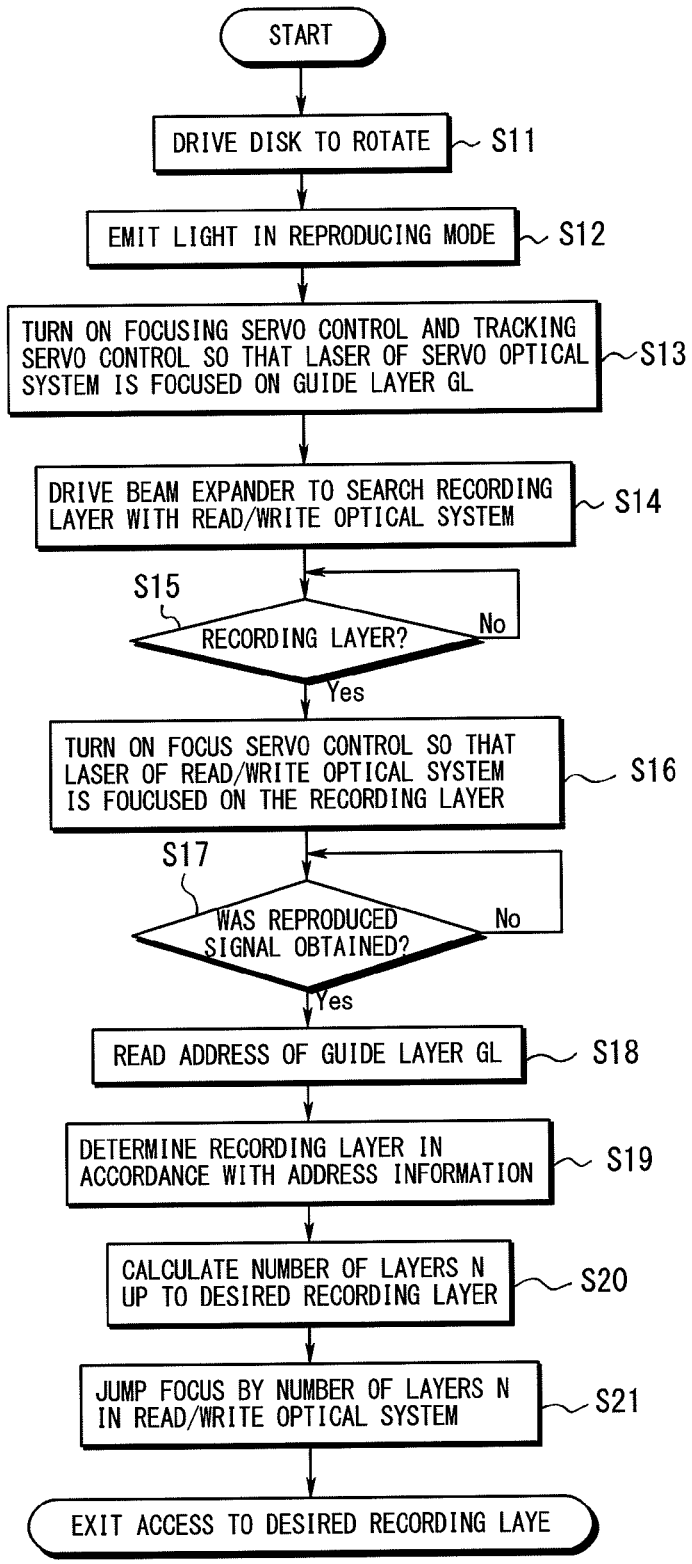
FIG. 8 is a flowchart showing an access operation to a desired recording layer of the optical disk of FIG. 6A.

The main controller 45 starts the recording mode of operation in accordance with a write command from a manipulation section (not shown). First, as shown in FIG. 8, the controller 45 provides a rotation initiation command to the recording medium rotation control section 31 to drive and rotate the optical disk 10 (step S11), supplying a light-emission drive command to the aforementioned read/write light source drive section and the guide light source drive section (step S12). Furthermore, the controller 45 commands the guide layer focus control section 34 to turn on the focus servo control and commands the tracking control section 36 to turn on the tracking servo control (step S13). The steps S11 to S13 are the same as the steps S1 to S3 of FIG. 4. After the step S13 has been carried out, the converged beam spot of the servo laser beam is to be located on the guide track including the start position of the innermost circumference of the guide layer GL on the optical disk 10.

After the step S13 has been carried out, the main controller 45 issues a search command to the recording layer focus control section 42 so that the read/write laser beam is focused on any one recording layer (step S14). In accordance with the search command of the step S14, the recording layer focus control section 42 first outputs to the beam expander drive section 43 the focus control signal that varies in level to drive the actuator 24c and gradually move the correcting lens 24a from one end of its movement range to the other. This allows for moving the position of the correcting lens 24a to the position associated with any one recording layer (for example, the recording layer L0).

After the step S14 has been carried out, the main controller 45 determines whether the read/write laser beam is focused on the recording layer (step S15). This determination is made in accordance with the recording layer focus error signal delivered from the recording layer focus error signal generation section 41. When the focus of the read/write laser beam reaches one recording layer, the recording layer focus error signal crosses zero. When the zero crossing of the recording layer focus error signal is detected, the main controller 45 determines that the read/write laser beam is focused on the recording layer, and then commands the recording layer focus control section 42 to turn on the focus servo control (step S16). The step S16 is the same as the step S8 of FIG. 4. When the step S16 is carried out, the focus servo control is initiated so that the read/write laser beam is focused on one recording layer of the optical disk 10.

The main controller 45 determines whether the reproduced signal has been obtained (step S17). If the read/write laser beam is successfully focused on one recording layer, the information stored in the preformat region formed on the one recording layer is obtained as the reproduced signal from the recording layer reproduced-signal generation section 44. When the reproduced signal has been obtained, the preformat region formed on the one recording layer is irradiated with the read/write laser beam. Accordingly, when the reproduced signal has been obtained, the main controller 45 reads the address of the current track of the guide layer GL from the output signal of the guide layer reproduced-signal generation section 38 (step S18), and then determines one recording layer in accordance with the address of the resulting current track (step S19). That is, in step S19, the process determines which one of the recording layers L0 to L2 is that one recording layer in accordance with the current track address. When that one recording layer is determined, the process calculates the number of layers N from the one recording layer to the desired recording layer (step S20). For example, assuming that the one recording layer is the recording layer L0 and the desired recording layer is the recording layer L2, the number of layers N is 2. The process then commands the recording layer focus control section 42 to jump the focus of the converged beam spot of the read/write laser beam by the number of layers N (step S21). In accordance with the command of the step S21, the recording layer focus control section 42 outputs to the beam expander drive section 43 the focus control signal that is indicative of the focus jump associated with the number of layers N, causing the beam expander drive section 43 to drive the actuator 24c. This allows for moving the position of the correcting lens 24a to the position associated with the desired recording layer. After this movement, the process provides the focus servo control so that the read/write laser beam is accurately focused on the desired recording layer of the optical disk 10.

Figure 9:
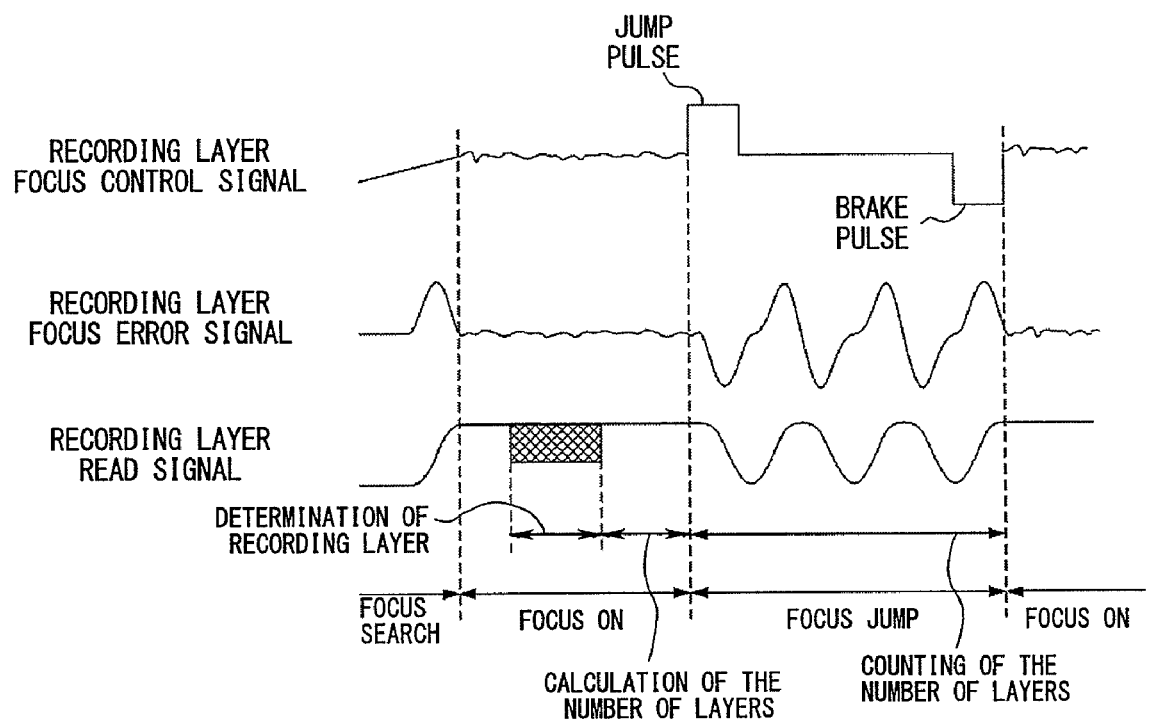
FIG. 9 is a waveform diagram showing variations in the recording layer focus control signal, the recording layer focus error signal, and the reproduced signal during the access operation of FIG. 8.

FIG. 9 illustrates changes in each of the recording layer focus control signal, the recording layer focus error signal, and the reproduced signal from the time at which through a search of a recording layer in the step S14, the read/write laser beam is focused on one recording layer and the reproduced signal is obtained until the focus is jumped to the desired recording layer in step S21. After the search of the one recording layer has been completed, the focus servo control on the one recording layer is turned on, and when the recording layer read signal is obtained, the one recording layer is determined in accordance with the address of the current track of the guide layer GL. After that, when the number of layers N up to the desired recording layer has been calculated, the process jumps the focus to the desired recording layer. As shown in FIG. 9, the recording layer focus control signal consists of the jump pulse and the brake pulse. In FIG. 9, N is equal to three, so that the focus jump is ended when zero crossing is detected three times during the focus jump period. At the same time the focus jump is ended, the process turns on the focus servo control on the desired recording layer.

As described above, in the second embodiment, the layer position information regions GT0 to GT2 of the guide layer GL of the optical disk 10 and the preformat regions RL0 to RL2 of the recording layers L0 to L2 correspond respectively to each other in the same disk radius range and in the same angle range, with the regions preformatted. Accordingly, the process can retract the focus to any one recording layer, and identify the one recording layer in accordance with the address read from the reproduced signal of the guide track of the guide layer GL when the reproduced signal of that one recording layer is available. It is thus possible to access to the desired recording layer by a focus jump, thereby shortening the time required to start a writing or reading operation.

It is important to note that after the focus servo control is turned on in step S16, the focus jump can be repeatedly made to search for a storage area until the preformat region appears in one recording layer. Or alternatively, the RPM of the spindle motor 7 can be increased when retracting the focus to one recording layer. This operation makes it possible to find the preformat region and confirm one recording layer more quickly, thus further shortening the time required to start the writing or reading operation.

Furthermore, the access operation of FIG. 8 to access the desired recording layer can also be applicable to the access to the optical disk 10 of FIG. 1A illustrated in the first embodiment. In this case, the focus may be retracted once to one recording layer, and then the preformat region may be searched while use is being made of the guide layer GL to move the guide track in the radial direction of the disk. This makes it possible to shorten the time to access the desired recording layer even when the preformat regions for each recording layer are located at different positions in the radial direction of the disk.

Figure 10A:
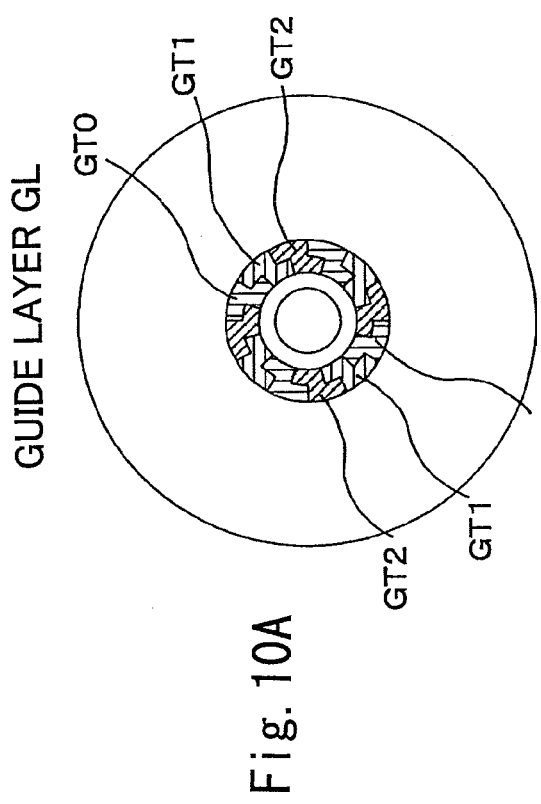
FIG. 10 is a view illustrating each layer of a guide-layer separated optical disk according to another embodiment of the present invention.
Figure 10B:
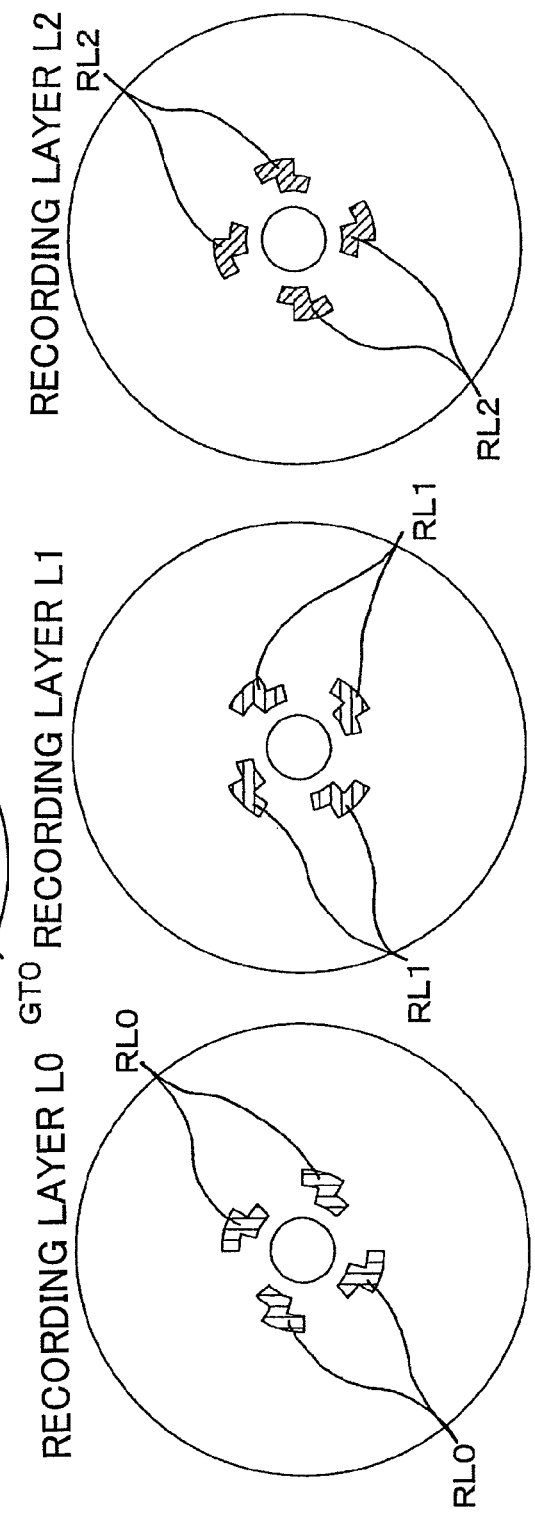

In the aforementioned first embodiment, the preformat regions for each recording layer of the optical disk are located at different positions in a radial direction, whereas in the second embodiment, the preformat regions for each recording layer are located at different positions in the circumferential direction of the optical disk. However, the preformat regions can also be located at random so long as the recorded region for each recording layer is present at different positions within the surface, so that the region and the address on the guide layer have one-to-one correspondence. For example, as shown in FIG. 10, the preformat regions RL0 to RL2 of the recording layers L0 to L2 and the layer position information regions GT0 to GT2 of the guide layer GL corresponding thereto may be formed to coincide respectively with each other in shape and position, so that multiple preformat regions RL0 to RL2 may be located within the recording layers L0 to L2.

Furthermore, the preformat region of each recording layer may be preferably associated with the layer position information region, and the layer position information region corresponding to the preformat region needs not to be formed in the same shape. For example, the correspondence relation, as shown in FIG. 11A, between the preformat region and the layer position information region can be accepted. That is, for example, as shown in FIG. 11A, in the range of ten circular guide tracks formed in the radial direction from the innermost circumference of the guide layer GL, the layer position information regions GT0 to GT2 associated with the recording layers L0 to L2 are formed at intervals of 120 degrees. This configuration is the same as that of the layer position information regions GT0 to GT2 of the guide layer GL shown in FIG. 6A. On the other hand, as shown in FIG. 11B, the recording layers L0 to L2 are provided with the preformat regions RL0 to RL2 associated with the layer position information regions GT0 to GT2 at the same radius position. That is, the preformat region RL0 is formed in the shape of a sector at the same radius position as the layer position information region GT0 except the position at which the layer position information region GT0 is formed. The preformat region RL1 is formed in the shape of a sector at the same radius position as the layer position information region GT1 except the position at which the layer position information region GT1 is formed. The preformat region RL2 is formed in the shape of a sector at the same radius position as the layer position information region GT2 except the position at which the layer position information region GT2 is formed. This arrangement allows inevitably for providing widened preformat regions, so that a larger amount of information regarding the layer can be recorded on the preformat region. In the case shown in FIG. 11A, the focus may be brought to the desired recording layer by detecting the absence of the reproduced signal of the preformat region of the guide layer GL, and thereafter, the process may wait until the disk is rotated, to read the preformat region of the desired recording layer.

Furthermore, the information stored in the preformat region of each recording layer is not limited to the information regarding the recording layer. Thus, any information maybe recorded thereon just to allow for acquiring the reproduced signal. Furthermore, the number of recording layers is not limited to three as shown in the aforementioned embodiments, but any number may do well so long as it is two or more.

The present invention is applicable not only to the optical disk drive apparatus but also to other apparatuses such as hard disk read and write apparatus equipped with the optical disk drive apparatus.

DESCRIPTION OF REFERENCE NUMERALS

7: spindle motor
10: optical disk
11, 21: light source
16: objective lens
24: beam expander
18, 26: photodetector
45: main controller

The invention claimed is:

1. A guide-layer separated optical recording medium comprising a guide layer with a guide track formed therein, and a plurality of recording layers, the guide layer and the plurality of recording layers being deposited separately from each other, wherein
a layer position information region for indicating position information of each of the recording layers, is formed on the guide track within a different range of the guide layer for each of the recording layers,
each of the recording layers includes a preformat region having a predetermined signal written on a record track along the guide track, and
the preformat region on each of the recording layers is provided in a region corresponding to the layer position information region.

2. The optical recording medium according to claim 1, wherein information regarding each of the recording layers is stored in the preformat region.

3. The optical recording medium according to claim 1, wherein the optical recording medium is an optical disk, and the recording layer information region and the preformat region are formed in the innermost circumference portion of the optical disk.

4. An optical recording medium drive apparatus for driving a guide-layer separated optical recording medium including a guide layer with a guide track formed therein and a plurality of recording layers, the guide layer and the plurality of recording layers being deposited separately from each other, wherein: a layer position information region for indicating position information of each of the recording layers, is formed on the guide track within a different range of the guide layer for each of the recording layers; each of the recording layers includes a preformat region having a predetermined signal written on a record track along the guide track; and the preformat region on each of the recording layers is provided in a region corresponding to the layer position information region, the drive apparatus comprising:
- a servo optical system which irradiates the optical recording medium with a first laser beam for a servo via an objective lens to detect a reflected beam from the guide layer;
- a read/write optical system which irradiates the optical recording medium with a second laser beam for reading or writing via the objective lens to detect a reflected beam from one of the plurality of recording layers;
- a reproduced-signal determination portion which determines whether a reproduced signal has been obtained, based on a detection level of a reflected beam from the preformat region by the read/write optical system;
- an information read portion which acquires position information of one of the plurality of recording layers based on a detection level of a reflected beam from the layer position information region by the servo optical system; and
- a controller which allows the second laser beam to access a desired one of the plurality of recording layers in accordance with a determination result by the reproduced-signal determination portion and the read position information by the information read portion.

5. The optical recording medium drive apparatus according to claim 4, wherein the controller comprises
- a portion which controls a position irradiated with the first laser beam so that the position information regarding the desired recording layer from the guide layer is acquired by the information read portion, and
- a portion which controls a focal position of the second laser beam of the read/write optical system so that the reproduced signal is obtained when the information read portion acquires the position information regarding the desired recording layer.

6. The optical recording medium drive apparatus according to claim 4, wherein the controller comprises
- a portion which controls a focal position of the second laser beam of the read/write optical system so as to obtain the reproduced signal,
- a portion which calculates the number of layers from one of the plurality of recording layers to the desired recording layer in accordance with the position information regarding the one recording layer acquired by the information read portion when the reproduced-signal determination portion determines that the reproduced signal has been obtained, and
- a portion which makes a focus jump of the position irradiated with the second laser beam to the desired recording layer in accordance with the number of layers.

7. A recording layer access method of an optical recording medium drive apparatus for driving a guide-layer separated optical recording medium including a guide layer with a guide track formed therein and a plurality of recording layers, the guide layer and the plurality of recording layers being deposited separately from each other, wherein: a layer position information region for indicating position information of each of the recording layers, is formed on the guide track within a different range of the guide layer for each of the recording layers; each of the recording layers includes a preformat region having a predetermined signal written on a record track along the guide track; and the preformat region on each of the recording layers is provided in a region corresponding to the layer position information region, and wherein the drive apparatus includes: a servo optical system for irradiating the optical recording medium with a first servo laser beam for a servo via an objective lens to detect a reflected beam from the guide layer; and a read/write optical system for irradiating the optical recording medium with a second laser beam for reading or writing via the objective lens to detect a reflected beam from one of the plurality of recording layers, the method comprising:
- a reproduced-signal determination step of determining whether a reproduced signal has been obtained, based on a detection level of a reflected beam from the preformat region by the read/write optical system;
- an information read step of acquiring position information of one of the plurality of recording layers based on a detection level of a reflected beam from the layer position information region by the servo optical system; and
- a control step of allowing the second laser beam to access a desired one of the plurality of recording layers in accordance with a determination result from the reproduced-signal determination step and the read position information from the information read step.

* * * * *